United States Patent
Wang et al.

(10) Patent No.: US 9,686,056 B2
(45) Date of Patent: Jun. 20, 2017

(54) PHICH TRANSMISSION IN TIME DIVISION DUPLEX SYSTEMS

(71) Applicant: BlackBerry Limited, Waterloo (CA)

(72) Inventors: Yiping Wang, Allen, TX (US); Jianfeng Weng, Kanata (CA); Jun Li, Richardson, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 24 days.

(21) Appl. No.: 13/658,576

(22) Filed: Oct. 23, 2012

(65) Prior Publication Data

US 2013/0301401 A1 Nov. 14, 2013
US 2014/0169151 A9 Jun. 19, 2014

Related U.S. Application Data

(60) Provisional application No. 61/645,939, filed on May 11, 2012.

(51) Int. Cl.
*H04W 4/00* (2009.01)
*H04L 5/00* (2006.01)
*H04L 5/14* (2006.01)

(52) U.S. Cl.
CPC ............ *H04L 5/001* (2013.01); *H04L 5/0055* (2013.01); *H04L 5/143* (2013.01)

(58) Field of Classification Search
USPC .................................................. 370/310–350
See application file for complete search history.

(56) References Cited

U.S. PATENT DOCUMENTS

| 8,116,271 | B2 | 2/2012 | Pi |
| 8,194,602 | B2 | 6/2012 | van Rensburg et al. |
| 8,194,603 | B2 | 6/2012 | Nimbalker et al. |
| 8,498,254 | B2 | 7/2013 | Dai et al. |
| 2009/0097447 | A1* | 4/2009 | Han et al. ..................... 370/330 |
| 2009/0259909 | A1* | 10/2009 | Luo ............... 714/748 |
| 2010/0195566 | A1* | 8/2010 | Krishnamurthy et al. ... 370/328 |
| 2011/0044259 | A1 | 2/2011 | Nimbalker et al. |
| 2011/0044275 | A1* | 2/2011 | Ishii .............................. 370/329 |
| 2012/0027110 | A1* | 2/2012 | Han ..................... H04J 11/0079 375/260 |

(Continued)

FOREIGN PATENT DOCUMENTS

| CN | 101594215 A | 12/2009 |
| CN | 101911577 A | 12/2010 |

(Continued)

OTHER PUBLICATIONS

Wang, Yiping, et al.: U.S. Appl. No. 13/658,596, filed Oct. 23, 2012; Title: PHICH Resource Provisioning in Time Division Duplex Systems.

(Continued)

*Primary Examiner* — Ricky Ngo
*Assistant Examiner* — Wei-Po Kao
(74) *Attorney, Agent, or Firm* — Conley Rose, P.C.; J. Robert Brown, Jr.; Albert A. Abbou (57) ABSTRACT

A method is provided for communication in a wireless telecommunication system. The method comprises multiplexing, by a network element, at least one symbol of a PHICH onto at least one resource element of a PCFICH.

20 Claims, 7 Drawing Sheets

| Uplink-Downlink Configuration | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

(56) References Cited

U.S. PATENT DOCUMENTS

| | | | |
|---|---|---|---|
| 2012/0039268 A1* | 2/2012 | Hakkinen | H04L 5/001 370/329 |
| 2012/0044275 A1 | 2/2012 | Kobayashi | |
| 2012/0207123 A1* | 8/2012 | Seo | H04L 1/1861 370/329 |
| 2012/0224535 A1* | 9/2012 | Kim | H04W 52/367 370/328 |
| 2012/0269180 A1 | 10/2012 | Li et al. | |
| 2013/0021990 A1* | 1/2013 | Roessel et al. | 370/329 |
| 2013/0194981 A1 | 8/2013 | Wang et al. | |
| 2013/0242813 A1 | 9/2013 | Wang et al. | |
| 2014/0056186 A1* | 2/2014 | Gao et al. | 370/280 |

FOREIGN PATENT DOCUMENTS

| | | | |
|---|---|---|---|
| CN | 101971678 A | 2/2011 | |
| KR | 20090089780 A | 8/2009 | |
| KR | 20100117045 A | 11/2010 | |
| KR | 20110139275 A | 12/2011 | |
| WO | WO 2011085804 A1 * | 7/2011 | |

OTHER PUBLICATIONS

3GPP TS 36.211 V10.2.0; 3rd Generation Partnership Project; Technical Specification Group Radio Access Network; Evolved Universal Terrestrial Radio Access (E-UTRA); Physical Channels and Modulation; Release 10; Jun. 2011; 103 pages.
3GPP TS 36.212 V10.2.0; 3rd Generation Partnership Project; Technical Specification Group Radio Access Network; Evolved Universal Terrestrial Radio Access (E-UTRA); Multiplexing and Channle Coding; Release 10; Jun. 2011; 78 pages.
3GPP TS 36.213 V10.2.0; 3rd Generation Partnership Project; Technical Specification Group Radio Access Network; Evolved Universal Terrestrial Radio Access (E-UTRA); Physical Layer Procedures; Release 10; Jun. 2011; 120 pages.
3GPP TSG-RAN WG1 #66bis; "eICIC Evaluations for Different Handover Biases"; R1-113566; Zhuhai, China; Oct. 10-14, 2011; 15 pages.
3GPP TSG RAN WG1 Meeting #66; "Consideration of X2 Backhaul for CoMP"; R1-112340; Athens, Greece; Aug. 22-26, 2011; 2 pages.
3GPP TSG RAN WG1 Meeting #67; "Summary of E-Mail Discussions on MTC Application Scenarios and Evaluation"; R1-114303; San Francisco, USA; Nov. 14-18, 2011; 3 pages.
3GPP TSG RAN WG1 Meeting #68bis; "On Single Receive RF Chain for Low-Cost MTC UEs"; R1-121255; Jeju, Korea; Mar. 26-30, 2012; 3 pages.
3GPP TSG RAN WG1 Meeting #68; "Design on HARQ and Scheduling Timing Linkage to Support Inter-Band CA with Different TDD Configurations"; R1-120336; Dresden, Germany; Feb. 6-10, 2012; 4 pages.
3GPP TSG RAN WG1 Meeting #68bis; "ePHICH Design for Rel-11"; R1-121649; Jeju, Korea; Mar. 26-30, 2012; 3 pages.
3GPP TSG RAN WG1 Meeting #68bis; "Support Common Control Channle in E-PDCCH"; R1-121479; Jeju, Korea; Mar. 26-30, 2012; 5 pages.
3GPP TSG RAN WG1 Meeting #68bis; "Other Control Channels for E-PDCCH"; R1-121481; Jeju, Korea; Mar. 26-30, 2012; 4 pages.
3GPP TSG RAN WG1 Meeting #51; "Hybrid FDM/CDM Based Multiplexing for ACK/NACK Signals in E-UTRA Downlink"; R1-074756; Jeju, Korea; Nov. 5-9, 2007; 4 pages.
3GPP TSG-RAN WG1 Meeting #68bis; "Cross-carrier Scheduling and HARQ Timing for Different TDD UL-DL Configurations"; R1-121853; Jeju, Korea; Mar. 26-30, 2012; 8 pages.
3GPP TSG-RAN WG1 #68; "Cross-Carrier Scheduling in Aggregation of Carriers with Different UL/DL Configurations"; R1-120072; Dresden, Germany; Feb. 6-10, 2012; 4 pages.
3GPP TSG RAN WG1 Meeting #68; "TDD Inter-Band Carrier Aggregation"; R1-120091; Dresden, Germany; Feb. 6-10, 2012; 4 pages.
PCT International Search Report; Application No. PCT/US2012/061709; Jan. 23, 2013; 3 pages.
PCT Written Opinion of the International Searching Authority; Application No. PCT/US2012/061709; Jan. 23, 2013; 6 pages.
PCT International Search Report; Application No. PCT/US2012/061713; Feb. 5, 2013; 3 pages.
PCT Written Opinion of the International Searching Authority; Application No. PCT/US2012/061713; Feb. 5, 2013; 4 pages.
Canadian Office Action; Application No. 2,872,384; Jul. 30, 2015; 4 pages.
Chinese Office Action; Application No. 201280073109.7; Jun. 24, 2015; 9 pages.
Final Office Action dated Sep. 19, 2014; U.S. Appl. No. 13/658,596, filed Oct. 23, 2012; 14 pages.
Notice of Allowance dated Oct. 16, 2014; U.S. Appl. No. 13/658,596, filed Oct. 23, 2012; 7 pages.
Taiwanese Office Action; Application No. 102115165; Sep. 22, 2014; 8 pages.
Taiwanese Office Action; Application No. 102115163; Sep. 10, 2014; 7 pages.
Korean Office Action as Received in Co-pending Application No. 10-2014-7032590 on Jan. 21, 2016, 4 pages. (No English translation available).
Canadian Office Action; Application No. 2,872,388; Feb. 26, 2016; 5 pages.
Notice of Allowance dated Feb. 2, 2015; U.S. Appl. No. 13/658,596, filed Oct. 23, 2012; 8 pages.
Korean Notice of Allowance; Application No. 10-2014-7032591; Apr. 7, 2015; 3 pages.
Office Action dated May 19, 2014; U.S. Appl. No. 13/658,596, filed Oct. 23, 2012; 19 pages.
Chinese Office Action as Received in Co-pending Application No. 201280073108.2 on Aug. 8, 2016; 6 pages.
Korean Notice of Allowance; Application No. 10-2014-7032590; Jul. 25, 2016; 6 pages.
Taiwan Notice of Allowance; Application No. 104104299; Sep. 1, 2016; 5 pages.
Canadian Office Action; Application No. 2,872,384; Sep. 30, 2016; 5 pages.
Chinese Office Action as Received in Co-pending Application No. 201280073106.2 on Mar. 15, 2017; 6 pages.

* cited by examiner

Figure 1

| Uplink-Downlink Configuration | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

PHICH TRANSMISSION IN TIME DIVISION DUPLEX SYSTEMS

FIELD OF THE DISCLOSURE

The present disclosure relates to control channels in wireless telecommunications systems.

BACKGROUND

As used herein, the term "user equipment" (alternatively "UE") might in some cases refer to mobile devices such as mobile telephones, personal digital assistants, handheld or laptop computers, and similar devices that have telecommunications capabilities. Such a UE might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device," and "mobile device" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, or a similar component rather than a traditional base station. Any such component will be referred to herein as an eNB, but it should be understood that such a component is not necessarily an eNB. Such a component may also be referred to herein as an access node.

LTE may be said to correspond to Third Generation Partnership Project (3GPP) Release 8 (Rel-8 or R8) and Release 9 (Rel-9 or R9), while LTE Advanced (LTE-A) may be said to correspond to Release 10 (Rel-10 or R10) and possibly also to Release 11 (Rel-11 or R11) and other releases beyond Release 11. As used herein, the terms "legacy", "legacy UE", and the like might refer to signals, UEs, and/or other entities that comply with LTE Release 10 and/or earlier releases but do not fully comply with releases later than Release 10. The terms "advanced", "advanced UE", and the like might refer to signals, UEs, and/or other entities that comply with LTE Release 11 and/or later releases. While the discussion herein deals with LTE systems, the concepts are equally applicable to other wireless systems as well.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. Embodiments are described herein in the context of an LTE wireless network or system, but can be adapted for other wireless networks or systems.

Figure 1:
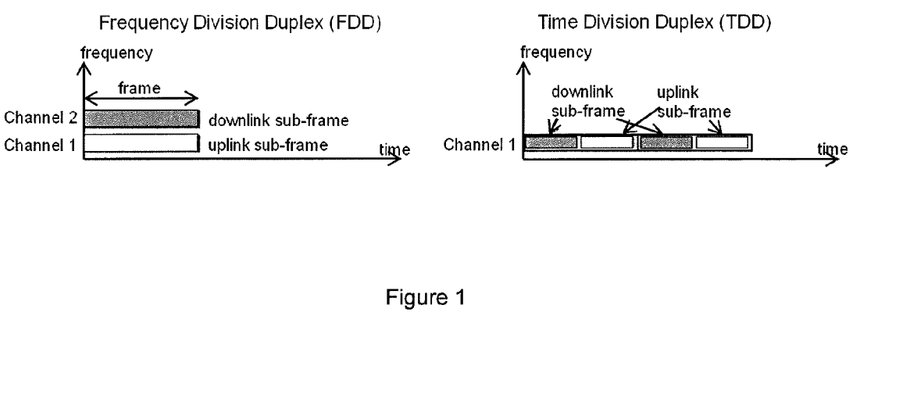
FIG. 1 is a diagram of frequency division duplex and time division duplex modes.

In an LTE system, downlink and uplink transmissions are organized into one of two duplex modes, frequency division duplex (FDD) mode and time division duplex (TDD) mode. The FDD mode uses paired spectrum where the frequency domain is used to separate the uplink (UL) and downlink (DL) transmissions. In TDD systems, on the other hand, unpaired spectrum is used where both UL and DL are transmitted over the same carrier frequency. The UL and DL are separated in the time domain. FIG. 1 illustrates both duplex modes.

In a 3GPP LTE TDD system, a subframe of a radio frame can be a downlink, an uplink or a special subframe. The special subframe comprises downlink and uplink time regions separated by a guard period for downlink to uplink switching. 3GPP Technical Specification (TS) 36.211 defines seven different UL/DL configuration schemes in LTE TDD operations. The schemes are listed in FIG. 2, where D represents downlink subframes, U represents uplink subframes, and S represents a special frame. A special frame includes three parts: the downlink pilot time slot (DwPTS), the uplink pilot time slot (UpPTS), and the guard period (GP). Downlink transmissions on the Physical Downlink Shared Channel (PDSCH) may be made in DL subframes or in the DwPTS portion of the special subframe.

Figure 2:
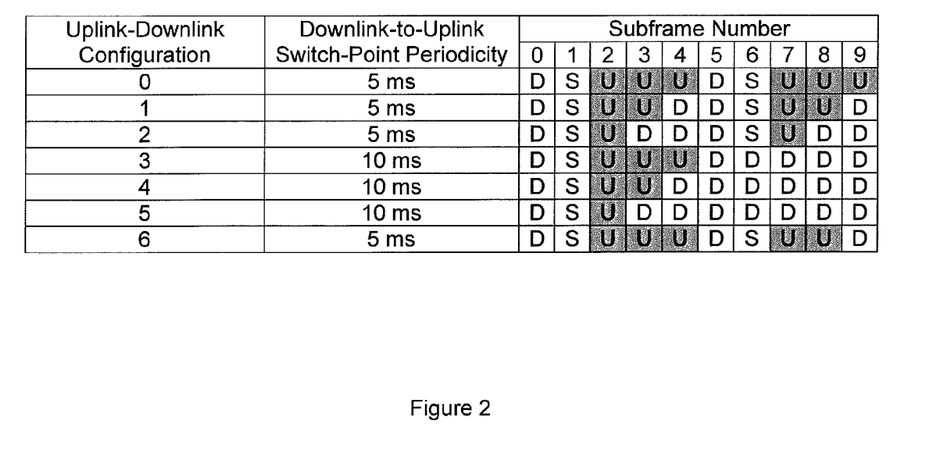
FIG. 2 is a table showing LTE time division duplex uplink/downlink configurations.

As FIG. 2 shows, there are two switching point periodicities specified in the LTE standard, 5 milliseconds (ms) and 10 ms. 5 ms switching point periodicity is introduced to support the co-existence between LTE and low chip rate UTRA TDD systems, and 10 ms switching point periodicity is for the coexistence between LTE and high chip rate UTRA TDD systems. The supported configurations cover a wide range of UL/DL allocations from a DL-heavy 1:9 ratio to a UL-heavy 3:2 ratio. The DL allocations in these ratios include both DL subframes and special subframes, which can also carry downlink transmissions in the DwPTS. Compared to FDD, TDD systems have more flexibility in terms of the proportion of resources assignable to uplink and downlink communications within a given assignment of spectrum. Specifically, it is possible to distribute the radio resources unevenly between the uplink and the downlink. Such a distribution may allow the radio resources to be utilized efficiently through the selection of an appropriate UL/DL configuration based on the interference situation and different traffic characteristics in the DL and the UL.

The UL and DL transmissions may not be continuous in an LTE TDD system. That is, UL or DL transmissions may not occur in every subframe. Therefore, the data channel transmissions with their scheduling grant and Hybrid Automatic Repeat Request (HARQ) timing relationships are separately defined in the 3GPP specifications. Currently, the HARQ acknowledgement/negative acknowledgement (ACK/NACK) timing relationship for downlink data channel transmission is defined by Table 10.1.3.1-1 in 3GPP TS 36.213. This timing relationship is shown in Table 1 below. Table 1 associates a UL ACK/NACK transmission at sub-frame n, with a DL PDSCH transmission at sub-frames n−ki, i=0 to M−1.

TABLE 1

Downlink HARQ association set index K: $\{k_0, k_1, \ldots k_{M-1}\}$

| UL-DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

The uplink HARQ ACK/NACK timing linkage with the PUSCH transmission is listed in Table 8.3-1 of 3GPP TS 36.213, which is provided as Table 2 below. Table 2 indicates that the Physical HARQ Indicator Channel (PHICH) carrying an ACK/NACK received in DL sub-frame i is linked with the UL data transmission in UL sub-frame i−k, where k is given in Table 2. For UL/DL configuration 0, in sub-frames 0 and 5, if $I_{PHICH}=1$, then k=6. Otherwise k=7. This is because there may be two ACK/NACKs for a UE transmitted on the PHICH in subframes 0 and 5.

TABLE 2 k for Uplink HARQ ACK/NACK association

| TDD UL/DL Config-uration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 or 6 | 4 | | | | 7 or 6 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | | 7 | 4 | | 6 |

The relationship of a UL grant and/or an ACK/NACK with a UL transmission/retransmission is listed in Table 8.2 of 3GPP TS 36.213, which is provided as Table 3 below. The UE, upon detection of a Physical Downlink Control Channel (PDCCH) with Downlink Control Information (DCI) format 0 and/or a PHICH transmission in sub-frame n intended for the UE, sends the corresponding PUSCH transmission in sub-frame n+k, where k is given in Table 3.

TABLE 3 k for Uplink PUSCH grant association

| TDD UL/DL Config-uration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

For TDD UL/DL configuration 0, if the Least Significant Bit (LSB) of the UL index in DCI format 0 is set to 1 in sub-frame n or a PHICH is received in sub-frame n=0 or 5 in the resource corresponding to $I_{PHICH}=1$ or a PHICH is received in sub-frame n=1 or 6, the UE sends the corresponding Physical Uplink Shared Channel (PUSCH) transmission in sub-frame n+7. If, for TDD UL/DL configuration 0, both the Most Significant Bit (MSB) and the LSB of the UL index in DCI format 0 are set to 1 in sub-frame n, the UE sends the corresponding PUSCH transmission in both sub-frames n+k and n+7, where k is given in Table 3.

It can be seen that both grant and HARQ timing linkage in TDD are more complicated than the fixed time linkages used in FDD. Accordingly, TDD usually requires more attention in design.

Figure 3:
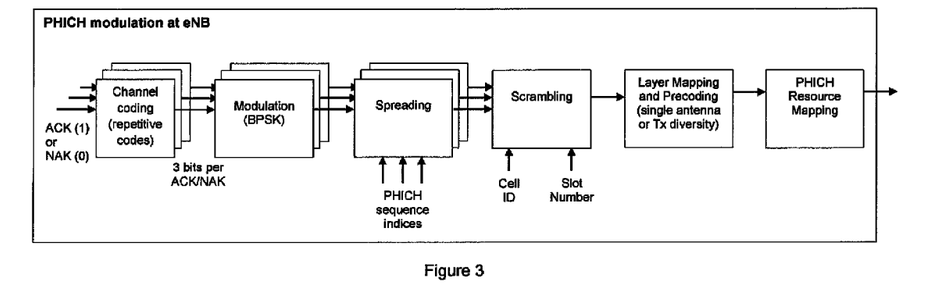
FIG. 3 is a diagram of a PHICH modulation process.

The PHICH specified in 3GPP TS 36.211 is used to transmit a HARQ-ACK, which indicates whether the eNB has correctly received UL shared channel (UL-SCH) data on the PUSCH. Multiple PHICHs can be transmitted in the same set of resource elements as a PHICH group. In the same PHICH group, multiple PHICHs may be multiplexed with different complex orthogonal Walsh sequences. In the case of a normal cyclic prefix, eight PHICHs can be multiplexed within one PHICH group as the length of the sequences is four and the PHICHs are also multiplexed in the complex domain. For an extended cyclic prefix, four PHICHs can be multiplexed within a PHICH group with length-2 Walsh sequences. FIG. 3 illustrates the PHICH modulation flow at the eNB.

For PHICH resource configuration, two parameters are signaled in the Master Information Block (MIB): the PHICH duration and the number of PHICH groups. The PHICH duration defines the number of Orthogonal Frequency Division Multiplexing (OFDM) symbols over which the PHICH is distributed. To avoid a dependency on the Physical Control Format Indicator Channel (PCFICH), the PHICH duration is independently signaled and can be different from the control region for the PDCCH. The number of PHICH groups is used to define the amount of PHICH resources. The correspondence between PHICH resources and UL-SCH transmission is implicit. That is, there is a predefined representation rule between the PHICH resource index and the PUSCH Physical Resource Block (PRB) index transmitting the UL-SCH. Because there is a PUSCH transmission without a PDCCH in the case of resource non-adaptive retransmission, a PHICH resource is linked to the actual PUSCH PRB index instead of the PDCCH Control Channel Element (CCE) index.

The PHICH resource is identified by the index pair $(n_{PHICH}^{group}, n_{PHICH}^{seq})$ where $n_{PHICH}^{group}$ is the PHICH group number and $n_{PHICH}^{seq}$ is the orthogonal sequence index within the group. As PHICH resource is implicitly linked to the PUSCH PRB index that is used to transmit the corresponding PUSCH, a UE may derive the assigned index pair with the scheduled PUSCH PRB index. If a PHICH resource is smaller than the number of PUSCH PRBs or if multiple users are scheduled in the same PUSCH PRBs, a collision can happen. That is, the same PHICH resource may be assigned to multiple UEs. To avoid a collision, a different cyclic shift value that is indicated in the uplink DCI format may be used to derive the assigned PHICH resource. The following equations are used to determine the PHICH group number and the orthogonal sequence index within the group:

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DRMS}) \bmod 2N_{SF}^{PHICH}$$

In the above equations, $n_{DMRS}$ is mapped from the cyclic shift for a Demodulation Reference Signal (DMRS) field according to the most recent PDCCH with uplink DCI format, as described in 3GPP TS 36.212 for the transport block or blocks associated with the corresponding PUSCH transmission. $n_{DMRS}$ is set to zero if there is no PDCCH with uplink DCI format for the same transport block, and if the initial PUSCH for the same transport block is semi-persistently scheduled or if the initial PUSCH for the same transport block is scheduled by a random access response grant. $N_{SF}^{PHICH}$ is the spreading factor size used for PHICH modulation as described in section 6.9.1 of 3GPP TS 36.211. $I_{PRB\_RA}^{lowest\_index}$ is the lowest PRB index in the first slot of the corresponding PUSCH transmission. $N_{PHICH}^{group}$ is the number of PHICH groups configured by higher layers as described in section 6.9 of 3GPP TS 36.211.

$$I_{PHICH} = \begin{cases} 1 & \text{for } TDD\ UL/DL \text{ configuration 0 with } PUSCH \\ & \text{transmission in subframe } n = 4 \text{ or } 9 \\ 0 & \text{otherwise.} \end{cases}$$

For FDD, the index $n_{PHICH}^{group}$ ranges from 0 to $N_{PHICH}^{group}-1$. For TDD, the number of PHICH groups may vary between downlink subframes and is given by $m_i \cdot N_{PHICH}^{group}$ where $m_i$ is given by Table 4. The index $n_{PHICH}^{group}$ in a downlink subframe with non-zero PHICH resources ranges from 0 to $m_i \cdot N_{PHICH}^{group} - 1$.

TABLE 4

The factor $m_i$ for TDD

| Uplink-downlink config- | Subframe number i | | | | | | | | | |
|---|---|---|---|---|---|---|---|---|---|---|
| uration | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1 |

Figure 4:
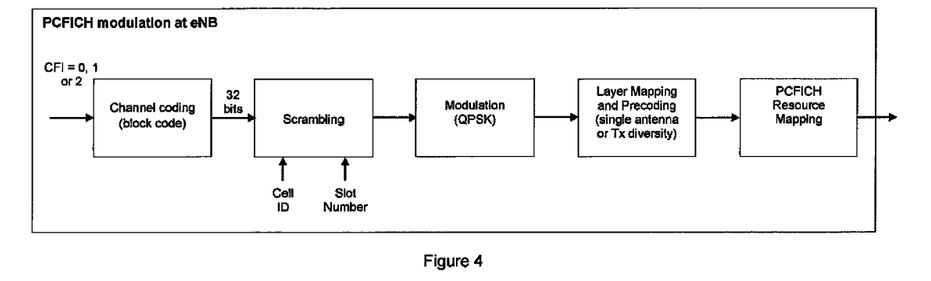
FIG. 4 is a diagram of a PCFICH modulation process.

The PCFICH is currently used to indicate the number of OFDM symbols used for transmission of PDCCHs in each subframe. This number is called the Control Format Indicator (CFI). There are three different CFI code words used in the current version of LTE and a fourth one is reserved for future use. Each codeword is 32 bits in length. FIG. 4 illustrates the PCFICH modulation flow at an eNB.

Figure 5:
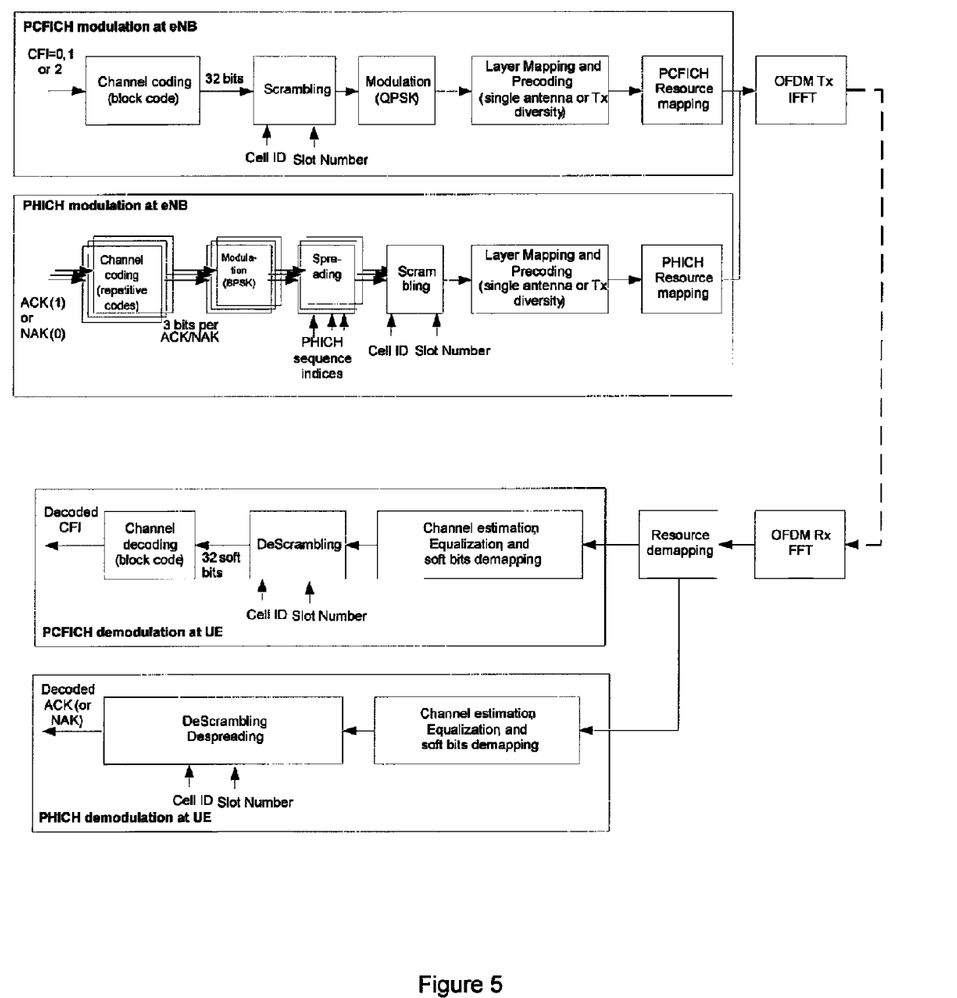
FIG. 5 is a diagram of generation and detection of the PHICH and the PCFICH.

In the current LTE specification, the PCFICH and the PHICH use different resource elements. The PCFICH takes four Resource Element Groups (REGs) and the PHICH consumes three REGs. FIG. 5 shows the modulation chain at an eNB and the demodulation chain at a UE.

To meet LTE-A requirements, the Rel-10 LTE specification defines carrier aggregation (CA) for TDD systems. However, the Rel-10 specification supports CA only with the same UL/DL configuration on the aggregated carriers because intra-band CA is prioritized, and having different UL/DL configurations is impossible to support in intra-band CA, especially when one single RF chain is used.

To achieve bandwidth flexibility and coexistence with legacy TDD systems, inter-band carrier aggregation with different TDD UL/DL configurations on the carriers from different bands has been proposed in LTE Rel-11. Many design details, such as supporting both half duplex and full duplex modes, supporting both separate scheduling (s-scheduling) and cross-carrier scheduling (c-scheduling), transmitting the PHICH on the cell carrying the UL grant, and transmitting the PUCCH only on the primary cell, have been agreed upon. Some agreements have also been reached on HARQ timing linkage.

It should be noted that a component carrier (CC) is also known as a serving cell or a cell. Furthermore, when multiple CCs are scheduled, for each UE, one of the CCs is designated as the primary carrier which is used for PUCCH transmission, semi-persistent scheduling, etc., while the remaining CCs are configured as secondary CCs. This primary carrier is also known as a PCell (Primary cell), while the secondary CC is known as an SCell (Secondary cell).

As discussed above, the timing linkage in TDD systems is not as simple as in FDD systems. The degree of complexity increases when CA with different TDD configurations is considered. This is because, with different TDD configurations, there are some time instances with conflicting subframes among aggregated CCs. For example, a UL subframe on CC1 may occur at the same time that CC2 has a DL subframe. Also, the timing linkage may be different for each different TDD configuration and, furthermore, certain control signals may have to be on a specific carrier. For example, the PHICH may have to be transmitted on the cell carrying the UL grant. These conditions may lead to a need to transmit a PUSCH ACK/NACK at a DL subframe that does not have a PHICH resource configured according to Table 4 above.

One of the 3GPP design agreements indicates that the PHICH can be transmitted only on the cell carrying the UL grant in the case of inter-band CA with different UL/DL configurations. Therefore, a PUSCH ACK/NACK may need to be transmitted at a DL subframe that does not have a PHICH resource configured.

Figure 6:
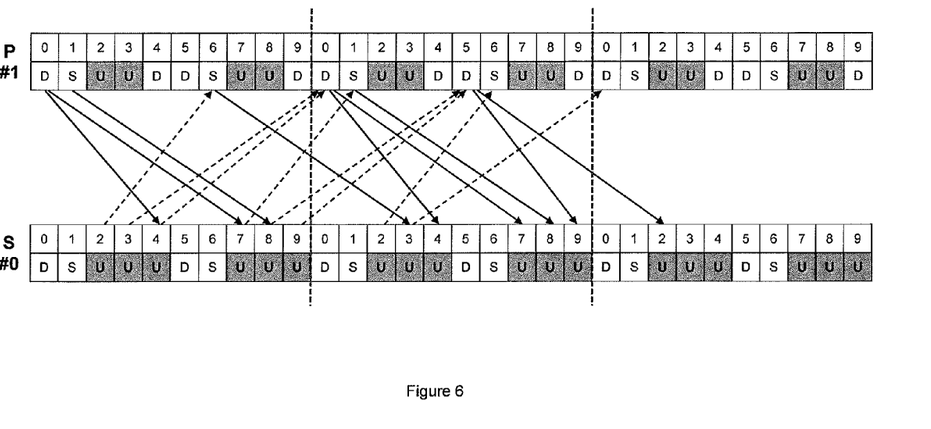
FIG. 6 is a diagram of uplink HARQ linkage in inter-band carrier aggregation with uplink/downlink configuration 1 on a PCell and configuration 0 on an SCell.

In an example case, two TDD carriers may be aggregated, the PCell may be set as UL/DL configuration 1, and the SCell may have UL/DL configuration 0, in full duplex mode. Based on the 3GPP design principles, the PCell follows its own UL HARQ timing relationship, which is configuration 1, and the SCell UL HARQ follows the timing of configuration 0. In this case, the PCell with UL/DL configuration 1 is the scheduling cell and carries the UL grant for the SCell, so the PUSCH ACK/NACK should be on the PCell as well. FIG. 6 illustrates the UL HARQ timing of the above scenario. The solid arrows represent the SCell UL grant for transmission/retransmission, and the dashed arrows represent the UL HARQ-ACK timing of the SCell.

It can be seen that the ACK/NACK for PUSCH transmission at subframe #3 or #4 of the SCell should be at subframe #0 of the PCell. However, with UL/DL configuration 1, referring to Table 4 above, there is no PHICH resource provisioned in the control region of PCell subframe #0. The same issue occurs for the PUSCH transmission at subframes #8 and #9 of the SCell. Additionally, there is no PHICH resource provisioned at subframe #5 of the PCell.

Embodiments of the present disclosure can resolve these PHICH resource issues by multiplexing the PHICH onto PCFICH resource elements. The extra PHICH resources created by multiplexing the PHICH for the carrier aggregation UEs onto the PCFICH provide the capability to convey up to six ACK/NACKs using PCFICH resource elements. These extra PHICH resources are recognized only by CA UEs, that is, UEs capable of operating under a carrier aggregation scenario. Legacy UEs can still use the same resources defined in Rel 8/9/10. Therefore, these embodiments are fully backward compatible.

In some cases, these embodiments may be used in conjunction with an adaptive retransmission procedure. In these cases, retransmission is directly triggered by a UL grant if there is a need for PUSCH retransmission. In this way, there is no need for an ACK/NACK transmission if there is no PHICH resource provisioned in some DL subframes.

In PCFICH generation, the scrambled bits are given by:

$$\tilde{b}^{(CFI)}(i) = (b^{(CFI)}(i) + c(i)) \mod 2 \quad (1)$$

where $b^{(CFM)}(i) \in \{0,1\}$ denotes the i-th bit in a CFI sequence for a given CFI value; $\{c(i)\}$ denotes the scrambling sequence initialized with $c_{init} = (\lfloor n_s/2 \rfloor + 1) \cdot (2N_{ID}^{cell} + 1) \cdot 2^9 + N_{ID}^{cell}$ at the start of each subframe; and $\tilde{b}^{(CFI)}(i)$ is the i-th scrambled bit.

Quadrature phase shift keying (QPSK) modulation is used to generate a block of 16 complex-valued symbols $\{d(k), k=0, 1, \ldots, 15\}$.

TABLE 5

QPSK modulation mapping

| $\tilde{b}^{(CFI)}(i), \tilde{b}^{(CFI)}(i+1)$ | I | Q |
|---|---|---|
| 00 | $1/\sqrt{2}$ | $1/\sqrt{2}$ |
| 01 | $1/\sqrt{2}$ | $-1/\sqrt{2}$ |
| 10 | $-1/\sqrt{2}$ | $1/\sqrt{2}$ |
| 11 | $-1/\sqrt{2}$ | $-1/\sqrt{2}$ |

It can be shown that the modulated PCFICH symbols can be written into the following form:

$$d^{(PCFICH)}(k) = \frac{1}{\sqrt{2}}(1 - 2 \cdot \tilde{b}^{(CFI)}(2k)) \cdot (1 - 2 \cdot c(2k)) + \quad (2)$$

$$j \cdot \frac{1}{\sqrt{2}}(1 - 2 \cdot \tilde{b}^{(CFI)}(2k+1)) \cdot (1 - 2 \cdot c(2k+1)),$$

$$k = 0, 1, 2, \ldots, 15$$

A PCFICH detection in general is a reversed operation of the PCFICH generation to find the one with the maximum energy of the following possible RxCFI correlations:

$$y^{(RxCFI)} = \left[\sum_{k=0}^{15} \text{Re}\{x^{(PCFICH)}(k)\} \cdot (1 - 2 \cdot \tilde{b}^{(RxCFI)}(2k)) \cdot (1 - 2 \cdot c(2k))\right]^2 + \quad (3)$$

$$\left[\sum_{k=0}^{15} \text{Im}\{x^{(PCFICH)}(k)\} \cdot (1 - 2 \cdot \tilde{b}^{(RxCFI)}(2k+1)) \cdot (1 - 2 \cdot c(2k+1))\right]^2,$$

$$RxCFI = 0, 1, 2$$

where $x^{(PCFICH)}(k)$ denotes the received signal at PCFICH RE k. It may be noted that $x^{(PCFICH)}(k) = d^{(PCFICH)}(k)$ in an ideal channel (no noise, no fading, and no phase rotation). Also, it is possible to add the real and imaginary parts and then take the square instead of taking the squares separately and then summing.

The detected CFI is given by:

$$CFI_{detected} = \underset{RxCFI \in \{0,1,2\}}{\arg\max} (y^{(RxCFI)}) \quad (4)$$

For the PHICH, the channel coding will generate a total of 12 coded bits with three repeated sections, each section having a length of four. Each PHICH ACK/NACK bit will be repeated 12 times and then be binary phase shift keying (BPSK) modulated, scrambled, and cover-coded with the PHICH orthogonal sequence. For a given PHICH sequence, the resulting symbols are given by:

$$d^{(PHICH)}(k) = \frac{1}{\sqrt{2}}(1+j)w_k^{(seqIdx)}(1 - 2 \cdot b^{(HI,seqIdx)}(k)) \cdot (1 - 2 \cdot c(k)), \quad (5)$$

$$k = 0, 1, 2, \ldots, 11 \text{ (normal } CP\text{)}$$

$$k = 0, 1, 2, \ldots, 5 \text{ (extended } CP\text{)}$$

where $w_k^{(seqIdx)}$ is the k-th element in the three-times-repeated orthogonal sequence with sequence index seqIdx; $b^{(HI,seqIdx)}(k)$ is a HI bit (for ACK/NACK) associated with sequence index seqIdx; and c(k) is a cell-specific scrambling sequence that is the same as that used for PCFICH generation.

The three-times-repeated orthogonal sequence is formed by repeating the complex orthogonal Walsh sequence $[w(0) \ldots w(N_{SF}^{PHICH}-1)]$ three times and concatenating the sequences together. The complex orthogonal Walsh sequence is given by Table 6 below, where the sequence index seqIdx=$n_{PHICH}^{seq}$ corresponds to the PHICH number within the PHICH group.

TABLE 6

Orthogonal sequences $[w(0) \ldots w(N_{SF}^{PHICH}-1)]$ for PHICH.

| Sequence index $n_{PHICH}^{seq}$ | Orthogonal sequence | |
|---|---|---|
| | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

The transmitted PHICH symbols are a summation of PHICH symbols for multiple PHICH sequences in one PHICH group.

PHICH detection involves extracting the transmitted PHICH information from the received channel-equalized symbols. Given a set of received symbols {x(k)}, the decision variable for PHICH sequence RxSeqIdx can be written in the following form:

$$y^{(RxseqIdx)} = \text{Re}\left\{\sum_k (1+j)^H \left(w_k^{(seqIdx)}\right)^H (1 - 2 \cdot c(k)) x(k)\right\}, \quad (6)$$

$k = 0, 1, 2, \ldots, 11$ (normal $CP$)

$k = 0, 1, 2, \ldots, 5$ (extended $CP$)

where the superscript H denotes a matrix Hermitian operation, which is equal to a conjugate transpose.

By comparing PCFICH generation Equation (2) and PHICH generation Equation (5), a sequence of PHICH symbols orthogonal to the sequence of PCFICH symbols in Equation (2) can be formulated by removing the BPSK modulation factor of (1+j) from Equation (5), replacing (1−2·c(k)) by (1−2·$b^{(CFI)}$(2k)). (1−2·c(2k)) for real-valued $w_{k(seqIdx)}$, replacing (1−2·c(k)) by (1−2·$b^{(CFI)}$(2k+1)). (1−2·c(2k+1)) for imaginary-valued $w_k^{(seqIdx)}$, and extending the length of PHICH spreading to 16 by repeating the HARQ indicator and Walsh sequence four times instead of three times.

The resulting PHICH symbols are given by:

$$d^{(PHICH)}(k) = \qquad (7)$$

$$\begin{cases} \frac{1}{\sqrt{2}} w_k^{(seqIdx)}(1 - 2 \cdot b^{(HI,seqIdx)}(k)) \cdot \\ (1 - 2 \cdot b^{(CFI)}(2k)) \cdot (1 - 2 \cdot c(2k)), & \text{if } w_k^{(seqIdx)} \text{ is real} \\ \frac{1}{\sqrt{2}} w_k^{(seqIdx)}(1 - 2 \cdot b^{(HI,seqIdx)}(k)) \cdot \\ (1 - 2 \cdot b^{(CFI)}(2k)) \cdot (1 - 2 \cdot c(2k+1)), & \text{otherwise,} \end{cases}$$

If Equation (7) is compared with Equation (2), it can be seen that Equation (7) can be viewed as a generalized extension of the real or imaginary part of Equation (2) with an additional layer of covering code $w_k^{(seqIdx)}$ $(1-2 \cdot b^{(HI,seqIdx)}(k))$. On the other hand, Equation (2) is a special case of Equation (7) when $b^{(HI,seqIdx)}(k)=0$ and $w_k^{(seqIdx)}=[1,1,1,1 \ldots]$ combined with the case when $b^{(HI,seqIdx)}(k)=0$ and $w_k^{(seqIdx)}=[j,j,j,j \ldots]$. If an orthogonal Walsh sequence from Table 6, except sequence number 0 [1,1,1,1] and sequence number 4 [j,j,j,j] for normal CP or sequence number 0 [1,1] and sequence number 2 [j,j] for extended CP, is used in Equation (7), and if the CFI hypothesis is correct, the sequence of PHICH symbols defined in Equation (7) is orthogonal to the sequence of PCFICH symbols defined in Equation (2).

As a result, the PHICH symbols defined in Equation (7) can be transmitted on top of PCFICH symbols defined in Equation (2) such that the PHICH and the PCFICH share the same set of resource elements. This may be useful in subframes where there is no provisioned resource for the PHICH.

Since the newly added PHICH symbols are differentiated by the Walsh code and orthogonal to the PCFICH symbols, this solution is backward compatible. Legacy UEs are still able to decode the PCFICH. According to CFI detection with Equations (3) and (4) and the orthogonality of the Walsh code, if the CFI hypothesis is correct, the overlay PHICH transmission does not affect PCFICH correlation in additive white Gaussian noise (AWGN) or when the frequency selectivity of the channel is not as severe. However, this overlay PHICH transmission may or may not increase the correlation value of the CFI detection using Equations (3) and (4), when the CFI hypothesis is not correct. This may slightly decrease the CFI detection performance. As the orthogonality of the Walsh code defined in Table 6 needs to be maintained just in one REG, and the four resource elements (REs) of one REG are closely located, it is expected that, in frequency selective fading channel cases, this solution will have only a limited performance degradation compared to the flat channel case. This performance degradation can be overcome by slightly increasing the transmit power on the PCFICH transmission.

CA UEs could make use of the extra power corresponding to the PHICH transmission to improve their PCFICH detection.

After the PCFICH is correctly detected, the PHICH can be detected, similarly to Equation (6), by the following equation:

$$y^{(Rxseqldx)} =$$

$$\begin{cases} \text{Re}\left\{ \sum_k \left(w_k^{(seqldx)}\right)^H (1-2\cdot b^{(CFI)}(2k))\cdot \\ \qquad (1-2\cdot c(2k))x(k) \right\}, & \text{if } w_k^{(seqldx)} \text{ is real} \\ \text{Re}\left\{ \sum_k \left(w_k^{(seqldx)}\right)^H (1-2\cdot b^{(CFI)}(2k+1))\cdot \\ \qquad (1-2\cdot c(2k+1))x(k) \right\}, & \text{otherwise,} \end{cases}$$

In above equation, $(1-2\cdot b^{(CFI)}(2k))\cdot(1-2\cdot c(2k))$ or $(1-2\cdot b^{(CFI)}(2k+1))\cdot(1-2\cdot c(2k+1))$ can be treated as new scrambling sequences for the overlay PHICH transmission.

To achieve orthogonality between the overlaying PHICH transmission and the PCFICH transmission, it can be seen that the number of sequences available to carry PHICH bits is reduced to six from eight. This solution enables an eNB to multiplex six PUSCH HARQ indicators onto a PCFICH channel without using any extra resource elements. The peak to average power ratio (PAPR) in this combined PCFICH and PHICH is no worse than in the existing PHICH.

In an embodiment, since there is only one PHICH group in this case and only six PHICHs available, the mapping between the PUSCH and these new PHICHs may be given by:

$$n_{PHICH}^{seq} = (I_{PRB\_RA}^{lowest\_index} + n_{DMRS}) \bmod N$$

where N is 6 for a normal cyclic prefix and 2 for an extended cyclic prefix. The other variables use the same notation as above.

The sequence index $seqIdx=n_{PHICH}^{seq}$ corresponding to the PHICH number is given by Table 7.

TABLE 7

Proposed orthogonal sequence to PHICH sequence index mapping.

| | Orthogonal sequence | |
|---|---|---|
| Sequence index $n_{PHICH}^{seq}$ | Normal cyclic prefix $N_{SF}^{PHICH} = 4$ | Extended cyclic prefix $N_{SF}^{PHICH} = 2$ |
| 0 | [+1 −1 +1 −1] | [+1 −1] |
| 1 | [+1 +1 −1 −1] | [+j −j] |
| 2 | [+1 −1 −1 +1] | — |
| 3 | [+j −j +j −j] | — |
| 4 | [+j +j −j −j] | — |
| 5 | [+j −j −j +j] | — |

Alternatively, explicit signaling can be used to define the mapping between the PUSCH and these new PHICH bits.

In an embodiment, if there are more than six PHICH bits, the first six bits can use the approach described above and the rest can rely on an adaptive retransmission procedure. The adaptive retransmission procedure uses a UL grant to instruct UEs regarding PUSCH retransmission. ACK/NACK information can be implicitly conveyed in this procedure, so there is no need for ACK/NACK transmission in DL subframes. Legacy UEs will not be impacted, since this procedure is UE-specific. Moreover, legacy UEs could also use this scheme if needed.

In an embodiment, the UL grant uses DCI format 0 transmitted in the PDCCH and contains a New Data Indicator (NDI). Whenever a new packet transmission begins, the one-bit NDI is toggled. For indication of retransmission, the one-bit NDI is kept at the same value as in the previous DCI 0 grant for the same HARQ process. The UE receives the UL grant and compares the NDI with the previously received grant's NDI. If the NDIs are the same, the UE knows that the UL grant is for the retransmission of the UL-SCH data on the previous PUSCH.

With adaptive retransmission, the retransmission Physical Resource Block (PRB) can be different from the initial PUSCH PRB. This provides an opportunity to choose more desirable radio resources based on the current radio channel conditions and may lead to better performance. However, since the UL grant is UE-specific, it may become costly, in terms of PDCCH resources, if there are a significant number of retransmissions relying on this scheme. Operators could apply a policy to restrict the feature to important users with high quality of service requirements.

Figure 7:
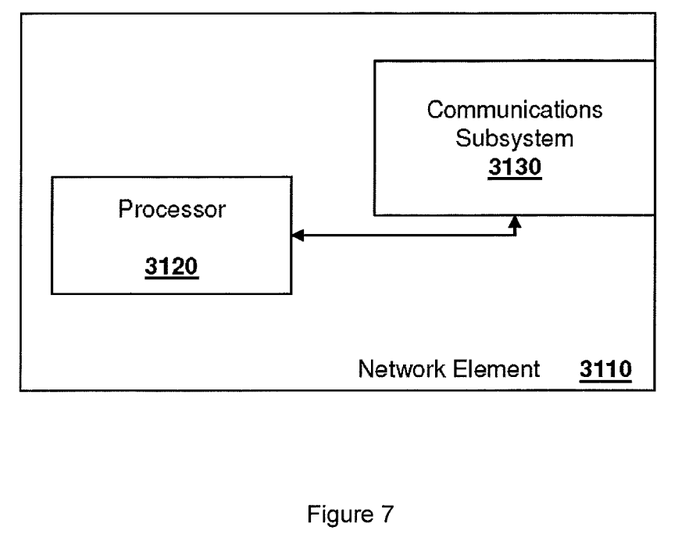
FIG. 7 is a simplified block diagram of an exemplary network element according to one embodiment.

The above may be implemented by a network element. A simplified network element is shown with regard to FIG. 7. In FIG. 7, network element 3110 includes a processor 3120 and a communications subsystem 3130, where the processor 3120 and communications subsystem 3130 cooperate to perform the methods described above.

Figure 8:
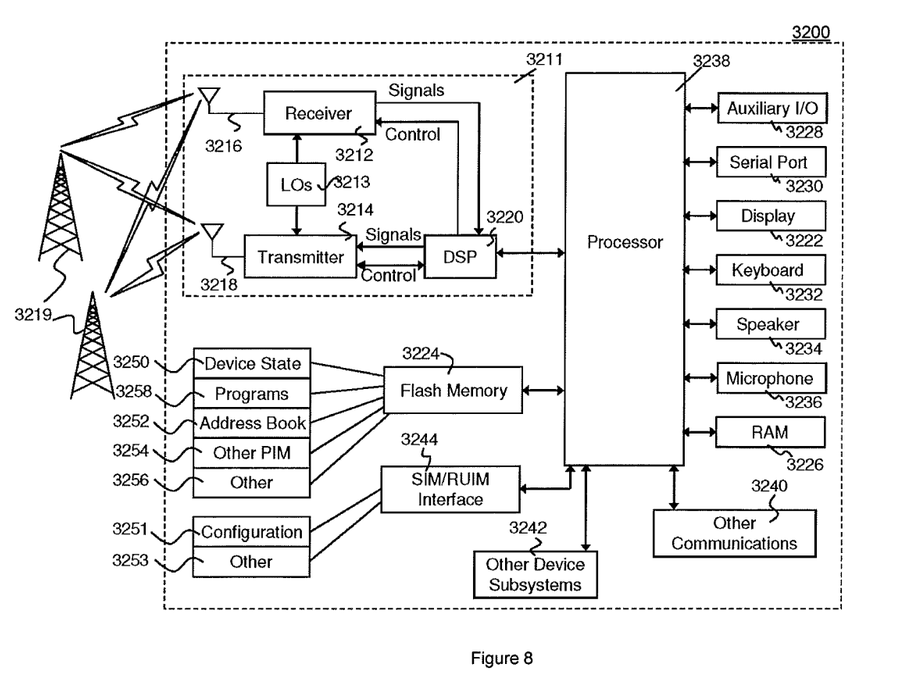
FIG. 8 is a block diagram with an example user equipment capable of being used with the systems and methods in the embodiments described herein.

Further, the above may be implemented by a UE. An example of a UE is described below with regard to FIG. 8. UE 3200 may comprise a two-way wireless communication device having voice and data communication capabilities. In some embodiments, voice communication capabilities are optional. The UE 3200 generally has the capability to communicate with other computer systems on the Internet. Depending on the exact functionality provided, the UE 3200 may be referred to as a data messaging device, a two-way pager, a wireless e-mail device, a cellular telephone with data messaging capabilities, a wireless Internet appliance, a wireless device, a smart phone, a mobile device, or a data communication device, as examples.

Where the UE 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. The particular design of the communication subsystem 3211 may be dependent upon the communication network in which the UE 3200 is intended to operate.

Network access requirements may also vary depending upon the type of network 3219. In some networks, network access is associated with a subscriber or user of the UE 3200. The UE 3200 may require a removable user identity module (RUIM) or a subscriber identity module (SIM) card in order to operate on a network. The SIM/RUIM interface 3244 is typically similar to a card slot into which a SIM/RUIM card may be inserted. The SIM/RUIM card may have memory and may hold many key configurations 3251 and other information 3253, such as identification and subscriber-related information.

When required network registration or activation procedures have been completed, the UE 3200 may send and receive communication signals over the network 3219. As illustrated, the network 3219 may consist of multiple base stations communicating with the UE 3200.

Signals received by antenna 3216 through communication network 3219 are input to receiver 3212, which may perform such common receiver functions as signal amplification, frequency down conversion, filtering, channel selection, and the like. Analog to digital (A/D) conversion of a received signal allows more complex communication functions, such as demodulation and decoding to be performed in the DSP 3220. In a similar manner, signals to be transmitted are processed, including modulation and encoding for example, by DSP 3220 and are input to transmitter 3214 for digital to analog (D/A) conversion, frequency up conversion, filtering, amplification, and transmission over the communication network 3219 via antenna 3218. DSP 3220 not only processes communication signals but also provides for receiver and transmitter control. For example, the gains applied to communication signals in receiver 3212 and transmitter 3214 may be adaptively controlled through automatic gain control algorithms implemented in DSP 3220.

The UE 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem, and any other device subsystems generally designated as 3242. Serial port 3230 may include a USB port or other port currently known or developed in the future.

Some of the illustrated subsystems perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions, such as a calculator or task list.

Operating system software used by the processor 3238 may be stored in a persistent store such as flash memory 3224, which may instead be a read-only memory (ROM) or similar storage element (not shown). The operating system, specific device applications, or parts thereof, may be temporarily loaded into a volatile memory such as RAM 3226. Received communication signals may also be stored in RAM 3226.

As shown, flash memory 3224 may be segregated into different areas for both computer programs 3258 and program data storage 3250, 3252, 3254 and 3256. These different storage types indicate that each program may allocate a portion of flash memory 3224 for their own data storage requirements. Processor 3238, in addition to its operating system functions, may enable execution of software applications on the UE 3200. A predetermined set of applications that control basic operations, including at least data and voice communication applications for example, may typically be installed on the UE 3200 during manufacturing. Other applications may be installed subsequently or dynamically.

Applications and software may be stored on any computer-readable storage medium. The computer-readable storage medium may be tangible or in a transitory/non-transitory medium such as optical (e.g., CD, DVD, etc.), magnetic (e.g., tape), or other memory currently known or developed in the future.

One software application may be a personal information manager (PIM) application having the ability to organize and manage data items relating to the user of the UE 3200 such as, but not limited to, e-mail, calendar events, voice mails, appointments, and task items. One or more memory stores may be available on the UE 3200 to facilitate storage of PIM data items. Such a PIM application may have the ability to send and receive data items via the wireless network 3219. Further applications may also be loaded onto the UE 3200 through the network 3219, an auxiliary I/O subsystem 3228, serial port 3230, short-range communications subsystem 3240, or any other suitable subsystem 3242, and installed by a user in the RAM 3226 or a non-volatile store (not shown) for execution by the processor 3238. Such flexibility in application installation may increase the functionality of the UE 3200 and may provide enhanced on-device functions, communication-related functions, or both. For example, secure communication applications may enable electronic commerce functions and other such financial transactions to be performed using the UE 3200.

In a data communication mode, a received signal such as a text message or web page download may be processed by the communication subsystem 3211 and input to the processor 3238, which may further process the received signal for output to the display 3222, or alternatively to an auxiliary I/O device 3228.

A user of the UE 3200 may also compose data items, such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of the UE 3200 is similar, except that received signals may typically be output to a speaker 3234 and signals for transmission may be generated by a microphone 3236. Alternative voice or audio I/O subsystems, such as a voice message recording subsystem, may also be implemented on the UE 3200. Although voice or audio signal output may be accomplished primarily through the speaker 3234, display 3222 may also be used to provide an indication of the identity of a calling party, the duration of a voice call, or other voice call-related information, for example.

Serial port 3230 may be implemented in a personal digital assistant (PDA)-type device for which synchronization with a user's desktop computer (not shown) may be desirable, but such a port is an optional device component. Such a port 3230 may enable a user to set preferences through an external device or software application and may extend the capabilities of the UE 3200 by providing for information or software downloads to the UE 3200 other than through a wireless communication network. The alternate download path may, for example, be used to load an encryption key onto the UE 3200 through a direct and thus reliable and trusted connection to thereby enable secure device communication. Serial port 3230 may further be used to connect the device to a computer to act as a modem.

Other communications subsystems 3240, such as a short-range communications subsystem, are further optional components which may provide for communication between the UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi, WiMAX, near field communication (NFC), and/or radio frequency identification (RFID). The other communications element 3240 may also be used to communicate with auxiliary devices such as tablet displays, keyboards or projectors.

Figure 9:
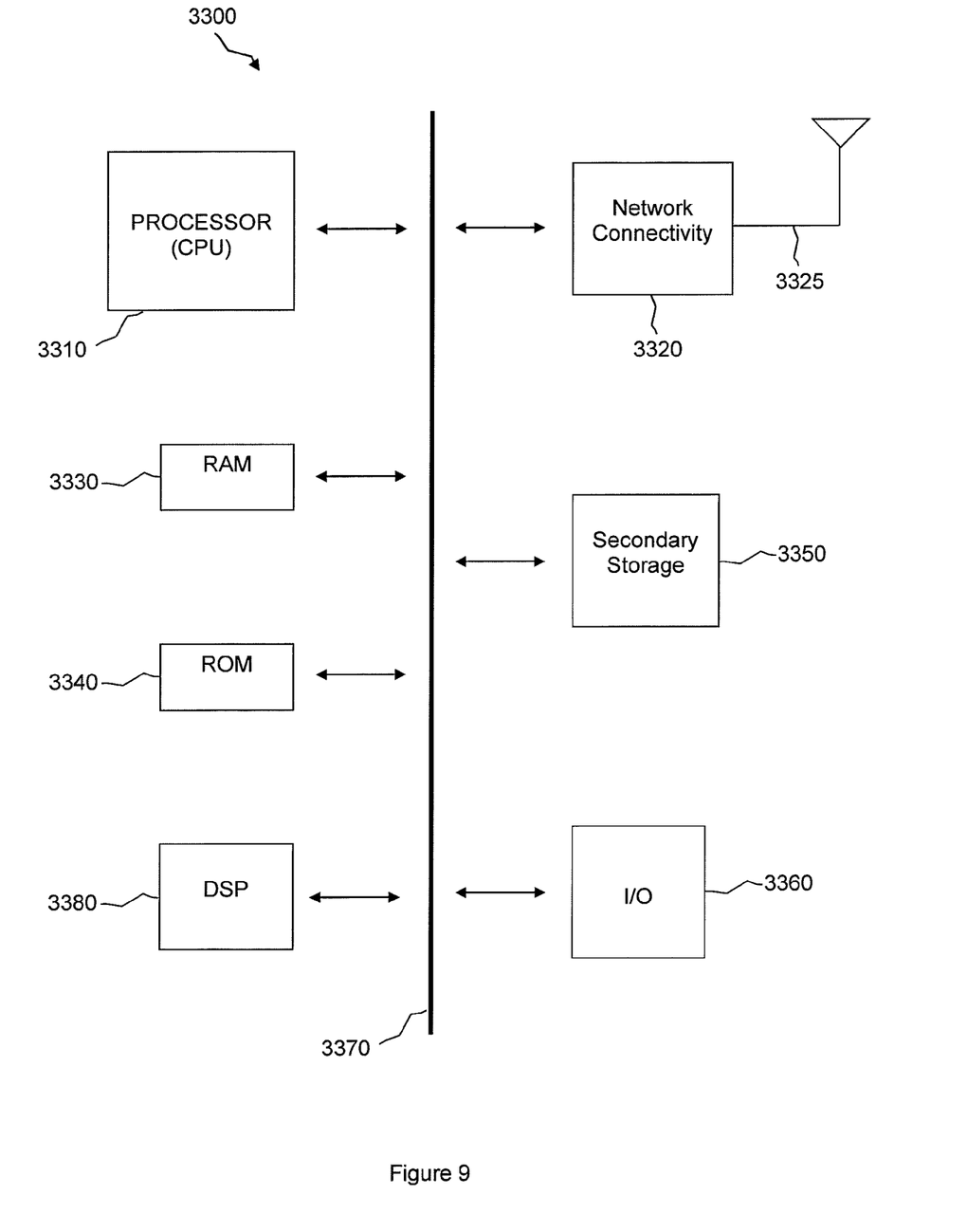
FIG. 9 illustrates a processor and related components suitable for implementing the several embodiments of the present disclosure.

The UE and other components described above might include a processing component that is capable of executing instructions related to the actions described above. FIG. 9 illustrates an example of a system 3300 that includes a processing component 3310 suitable for implementing one or more embodiments disclosed herein. In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

In an embodiment, a method for communication in a wireless telecommunication system is provided. The method comprises multiplexing, by a network element, at least one symbol of a PHICH onto at least one resource element of a PCFICH.

In another embodiment, a network element is provided. The network element comprises a processor configured such that the network element multiplexes at least one symbol of a PHICH onto at least one resource element of a PCFICH.

The following are incorporated herein by reference for all purposes: 3GPP TS 36.211, 3GPP TS 36.212, and 3GPP TS 36.213.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for communication in a wireless telecommunication system, the method comprising:
multiplexing, by a network element, at least one symbol of a physical HARQ (hybrid automatic repeat request) indicator channel (PHICH) onto at least one resource element of a physical control format indicator channel (PCFICH) such that the at least one resource element is shared by the PHICH and PCFICH, wherein the at least one PHICH symbol is multiplexed in a control region of a subframe in which a resource for the PHICH is not reserved; and transmitting, by the network element, the multiplexed symbol to a user equipment, wherein extra PHICH resources are created in the control region by multiplexing the at least one PHICH symbol onto the at least one PCFICH resource element, and wherein the user equipment is configured to convey up to six acknowledgement/negative acknowledgement (ACK/NACK) signals using the extra PHICH resources created in the control region.

2. The method of claim 1, wherein the at least one PHICH symbol is mapped to a physical uplink shared channel (PUSCH) by the following equation:

$$n_{PHICH}^{seq} = (I_{PRB\_RA}^{lowest\_index} + n_{DMRS}) \bmod N$$

where N is 6 for a normal cyclic prefix and 2 for an extended cyclic prefix.

3. The method of claim 2, wherein explicit signaling is used to define the mapping between the PUSCH and the at least one PHICH symbol.

4. The method of claim 1, wherein channel coding for the PHICH generates a total of 16 coded bits with four repeated sections, each section having a length of four for normal cyclic prefix mode and a length of two for extended cyclic prefix mode, and wherein each PHICH acknowledgement/negative acknowledgement (ACK/NACK) bit is repeated 16 times and then binary phase shift keying (BPSK) modulated, scrambled, and cover-coded with the PHICH orthogonal sequence.

5. The method of claim 4, wherein, for a given PHICH sequence, the resulting symbols are given by:

$$d^{(PHICH)}(k) = \begin{cases} \frac{1}{\sqrt{2}} w_k^{(seqIdx)} (1 - 2 \cdot b^{(HI, seqIdx)}(k)) \cdot \\ (1 - 2 \cdot b^{(CFI)}(2k)) \cdot (1 - 2 \cdot c(2k)), & \text{if } w_k^{(seqIdx)} \text{ is real} \\ \frac{1}{\sqrt{2}} w_k^{(seqIdx)} (1 - 2 \cdot b^{(HI, seqIdx)}(k)) \cdot \\ (1 - 2 \cdot b^{(CFI)}(2k+1)) \cdot (1 - 2 \cdot c(2k+1)), & \text{otherwise} \end{cases}$$

where $w_k^{(seqIdx)}$ is the k-th element in the four-times-repeated orthogonal sequence with sequence index seqIdx; $b^{(HI, seqIdx)}(k)$ is a HI bit (for ACK/NACK) associated with sequence index seqIdx; $b^{(CFI)}(i) \in \{0,1\}$ for i=2k and 2k+1 denotes the i-th bit in a CFI (Control Format Indicator) sequence for a given CFI value; and c(k) is a cell-specific scrambling sequence that is the same as that used for PCFICH generation.

6. The method of claim 4, wherein the four-times-repeated orthogonal sequence is formed by repeating the complex orthogonal Walsh sequence $[w(0) \ldots w(N_{SF}^{PHICH}-1)]$ four times and concatenating the sequences together.

7. The method of claim 1, wherein power on the PCFICH is increased to overcome performance degradation caused by the multiplexing of the PHICH and the PCFICH.

8. The method of claim 1, wherein the network element includes, in an uplink grant to a transmitting entity, a new data indicator capable of assuming one of two different values, wherein the network element changes the value of the new data indicator when the network element requests a new data transmission from the transmitting entity, and wherein the network element does not change the value of the new data indicator when the network element requests a retransmission from the transmitting entity.

9. The method of claim 1, further comprising the network element including a new data indicator in an uplink grant to a transmitting entity, wherein the new data indicator is included in the uplink grant when the number of PHICH bits to be transmitted is greater than the number of PHICH bits that can be multiplexed onto the PCFICH.

10. The method of claim 1, wherein the network element is a primary cell in a wireless telecommunication system that employs carrier aggregation.

11. A network element in a wireless telecommunication system, the network element comprising:

a processor configured such that the network element multiplexes at least one symbol of a physical HARQ (hybrid automatic repeat request) indicator channel (PHICH) onto at least one resource element of a physical control format indicator channel (PCFICH) such that the at least one resource element is shared by the PHICH and PCFICH, wherein the at least one PHICH symbol is multiplexed in a control region of a subframe in which a resource for the PHICH is not reserved, the processor further configured such that the network element transmits the multiplexed symbol to a user equipment, wherein extra PHICH resources are created in the control region by multiplexing the at least one PHICH symbol onto the at least one PCFICH resource element, and wherein the user equipment is configured to convey up to six acknowledgement/negative acknowledgement (ACK/NACK) signals using the extra PHICH resources created in the control region.

12. The network element of claim 11, wherein the at least one PHICH symbol is mapped to a physical uplink shared channel (PUSCH) by the following equation:

$$n_{PHICH}^{seq} = (I_{PRB\_RA}^{lowest\_index} + n_{DMRS}) \bmod N$$

where N is 6 for a normal cyclic prefix and 2 for an extended cyclic prefix.

13. The network element of claim 12, wherein explicit signaling is used to define the mapping between the PUSCH and the at least one PHICH symbol.

14. The network element of claim 11, wherein channel coding for the PHICH generates a total of 16 coded bits with four repeated sections, each section having a length of four for normal cyclic prefix mode and a length of two for extended cyclic prefix mode, and wherein each PHICH acknowledgement/negative acknowledgement (ACK/NACK) bit is repeated 16 times and then binary phase shift keying (BPSK) modulated, scrambled, and cover-coded with the PHICH orthogonal sequence.

15. The network element of claim 14, wherein, for a given PHICH sequence, the resulting symbols are given by:

$$d^{(PHICH)}(k) = \begin{cases} \frac{1}{\sqrt{2}} w_k^{(seqIdx)} (1 - 2 \cdot b^{(HI, seqIdx)}(k)) \cdot \\ (1 - 2 \cdot b^{(CFI)}(2k)) \cdot (1 - 2 \cdot c(2k)), & \text{if } w_k^{(seqIdx)} \text{ is real} \\ \frac{1}{\sqrt{2}} w_k^{(seqIdx)} (1 - 2 \cdot b^{(HI, seqIdx)}(k)) \cdot \\ (1 - 2 \cdot b^{(CFI)}(2k+1)) \cdot (1 - 2 \cdot c(2k+1)), & \text{otherwise} \end{cases}$$

where $w_k^{(seqIdx)}$ is the k-th element in the four-times-repeated orthogonal sequence with sequence index seqIdx; $b^{(HI, seqIdx)}(k)$ is a HI bit (for ACK/NACK) associated with sequence index seqIdx; $b^{(CFI)}(i) \in \{0,1\}$ for i=2k and 2k+1 denotes the i-th bit in a CFI (Control Format Indicator) sequence for a given CFI value; and c(k) is a cell-specific scrambling sequence that is the same as that used for PCFICH generation.

16. The network element of claim 14, wherein the four-times-repeated orthogonal sequence is formed by repeating the complex orthogonal Walsh sequence [w(0) . . . $w(N_{SF}^{PHICH}-1)$] four times and concatenating the sequences together.

17. The network element of claim 11, wherein power on the PCFICH is increased to overcome performance degradation caused by the multiplexing of the PHICH and the PCFICH.

18. The network element of claim 11, wherein the network element includes, in an uplink grant to a transmitting entity, a new data indicator capable of assuming one of two different values, wherein the network element changes the value of the new data indicator when the network element requests a new data transmission from the transmitting entity, and wherein the network element does not change the value of the new data indicator when the network element requests a retransmission from the transmitting entity.

19. The network element of claim 11, wherein the network element includes a new data indicator in an uplink grant to a transmitting entity when the number of PHICH bits to be transmitted is greater than the number of PHICH bits that can be multiplexed onto the PCFICH.

20. The network element of claim 11, wherein the network element is a primary cell in a wireless telecommunication system that employs carrier aggregation.

* * * * *